US008559035B2

(12) United States Patent
Merriam

(10) Patent No.: US 8,559,035 B2
(45) Date of Patent: Oct. 15, 2013

(54) METHOD AND SYSTEM FOR DETERMINING A CONFIGURATION OF A DOCUMENT PRODUCTION ENVIRONMENT

(75) Inventor: Ray Uri Merriam, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1118 days.

(21) Appl. No.: 12/488,857

(22) Filed: Jun. 22, 2009

(65) Prior Publication Data
US 2010/0321720 A1 Dec. 23, 2010

(51) Int. Cl.
*G06F 3/12* (2006.01)
(52) U.S. Cl.
USPC .......................... 358/1.15; 358/1.1; 705/7.11
(58) Field of Classification Search
USPC .................... 358/1.15, 1.1; 705/7.11
See application file for complete search history.

(56) References Cited

U.S. PATENT DOCUMENTS

| 5,897,629 A | 4/1999 | Shinagawa et al. | |
|---|---|---|---|
| 2002/0188489 A1* | 12/2002 | Cheng et al. | 705/8 |
| 2006/0178917 A1 | 8/2006 | Merriam et al. | |

OTHER PUBLICATIONS

Omura Riyousuke,Optimum Arrangement Analyzing Apparatus, Method, and Program,Oct. 14, 2004, JP 2004289642 A.*

Dijkstra, "A Note on Two Problems in Connexion with Graphs", Numerische Mathematic 1, 1959, pp. 269-271.
Or et al., "Highly Automatic Approach to Architectural Floorplan Image Understanding and Model Generation", Proceeding of the 10th Fall Workshop Vision, Modeling and Visualization, pp. 25-32.
Whiting, "Geometric, Topological and Semantic Analysis of Multi-Building Floor Plan Data", M.S. Thesis, MIT, Department of Architecture, May 2006.
Setalaphruk, "Topological Map Generation from Simplified Map for Mobile Robot Navigation", Proceedings of the Annual Conference of JSAI, 2002, vol. 16, pp. 109-110.
Non Final Office Action dated Aug. 1, 2013 of U.S. Appl. No. 12/488,900, filed Jun. 22, 2009, 28 pages.

* cited by examiner

*Primary Examiner* — Benny Q Tieu
*Assistant Examiner* — Martin Mushambo
(74) *Attorney, Agent, or Firm* — Fox Rothschild LLP

(57) ABSTRACT

A system for determining a configuration of print-related devices in a document environment may include a computing device and a computer-readable storage medium in communication with the computing device. The computer-readable storage medium may include programming instructions for identifying a plurality of environment requirements including one or more required print capabilities and a ratio of users to print-related devices associated with a document environment and, for each print-related device currently in the document environment, identifying a corresponding spatial entity having associated print volume information and associated print capability information, grouping a plurality of the spatial entities into one or more capability groups based on the print capability information associated with the spatial entities, and determining recommended print-related devices for the document environment.

21 Claims, 9 Drawing Sheets

METHOD AND SYSTEM FOR DETERMINING A CONFIGURATION OF A DOCUMENT PRODUCTION ENVIRONMENT

CROSS REFERENCE TO RELATED APPLICATIONS

This application is related to U.S. patent application Ser. No. 12/488,900, Jun. 22, 2009, title "Optimal Mapping of a Spatial Print Infrastructure".

NOT APPLICABLE

BACKGROUND

This application relates to a method and system for determining a configuration of an environment, and more particularly to a method and system for determining a configuration of a document production environment.

It is often difficult to determine the best print devices to place in an environment, such as an office environment or the like. Certain tools are available that attempt to automate this determination, such as the tool described in U.S. Patent Application Publication No. 2006/0178917 to Merriam et al., the disclosure of which is incorporated by reference herein in its entirety.

The current tools consider the distance between print devices in order to constrain the number of print devices in a large portion of a specific area, but they do not utilize spatial knowledge regarding the relative locations of the users or the printing needs of different spatial entities within the environment. For example, the current tools can estimate how many color printers are needed on every floor of a building. However, this estimate does not guarantee that the identified devices will have the correct distribution of color printing performance needed by each group of users on the floor.

SUMMARY

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

It must be noted that as used herein and in the appended claims, the singular forms "a," "an," and "the" include plural reference unless the context clearly dictates otherwise. Unless defined otherwise, all technical and scientific terms used herein have the same meanings as commonly understood by one of ordinary skill in the art. As used herein, the term "comprising" means "including, but not limited to."

In an embodiment, a system for determining a configuration of print-related devices in a document environment may include a computing device and a computer-readable storage medium in communication with the computing device. The computer-readable storage medium may include one or more programming instructions for identifying a plurality of environment requirements including one or more required print capabilities and a ratio of users to print-related devices associated with a document environment and for each print-related device currently in the document environment, identifying a corresponding spatial entity having associated print volume information and associated print capability information. The computer-readable storage medium may include one or more programming instructions for grouping a plurality of the spatial entities into one or more capability groups based on the print capability information associated with the spatial entities and determining one or more recommended print-related devices for the document environment by analyzing the print volume information and print capability information associated with a plurality of capability groups such that the recommended print-related devices satisfy the environment requirements. Each capability group may be associated with the print volume information and print capability information associated with the spatial entities including the capability group.

In an embodiment, a system for determining a configuration of print-related devices in a document environment may include a computing device and a computer-readable storage medium in communication with the computing device. The computer-readable storage medium may include one or more programming instructions for identifying a plurality of environment requirements including one or more required print capabilities and a ratio of users to print-related devices associated with a document environment and for each print-related device currently in the document environment, identifying a corresponding spatial entity having associated print volume information and associated print capability information. The computer-readable storage medium may include one or more programming instructions for grouping a plurality of the spatial entities into one or more capability groups based on the print capability information associated with the spatial entities and determining one or more recommended print-related devices for the document environment by modeling the print volume information and the print capability information for different combinations of capability groups. Each capability group may be associated with the print volume information and print capability information associated with the spatial entities comprising the capability group. The one or more recommended print-related devices satisfy the environment requirements.

BRIEF DESCRIPTION OF THE DRAWINGS

Aspects, features, benefits and advantages of the present invention will be apparent with regard to the following description and accompanying drawings, of which.

DETAILED DESCRIPTION

For purposes of the discussion below, a "print-related device" is a machine, device, document production device and/or the like used for document production. For example, a print-related device may be a printer, a scanner, a fax machine and/or the like.

An "environment" refers to an infrastructure having one or more print-related devices. For example, an environment may be an office environment, a workshop environment, a print shop environment and/or the like. An environment may be a free-standing entity, or it may be part of a corporation or other entity. In an embodiment, an environment may include one or more facilities in one location or across multiple locations. An environment may be one or more floors of a building, a portion of a floor and/or the like.

A "spatial entity" is the content of an area surrounding a print-related device. A spatial entity may include one or more users of the print-related device who are located within the area. For example, in an office environment, a spatial entity may encompass the users associated with one or more offices, desks, cubicles and/or the like located within the environment.

A "capability" is a function or operation that is performable by a print-related device. Exemplary capabilities may include fax, copy, scan, print, finishing operations and/or the like.

A "capability group" represents a group of users, print volume information associated with the users' output and any capabilities required by the users. In an embodiment, a capability group may include one or more spatial entities.

Figure 1:
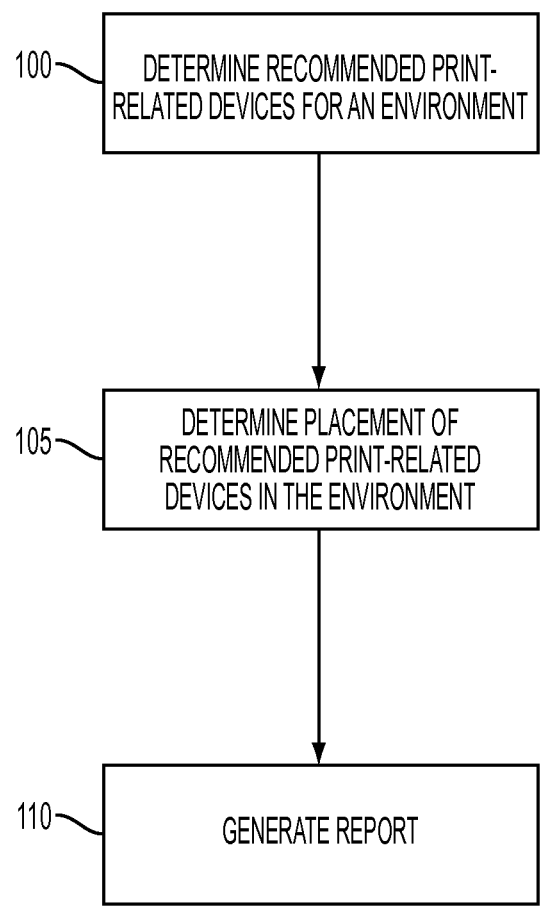
FIG. 1 illustrates an exemplary method of determining a configuration for an environment according to an embodiment.

In an embodiment, a configuration of print-related devices in an environment may be determined that reduces or minimizes a customer's cost, reduces or minimizes a vendor's cost, increases the efficiency of the environment and/or the like. FIG. 1 illustrates an exemplary method of determining a configuration for an environment according to an embodiment. As illustrated by FIG. 1, the method may include determining 100 one or more recommended print-related devices for the environment.

Figure 2:
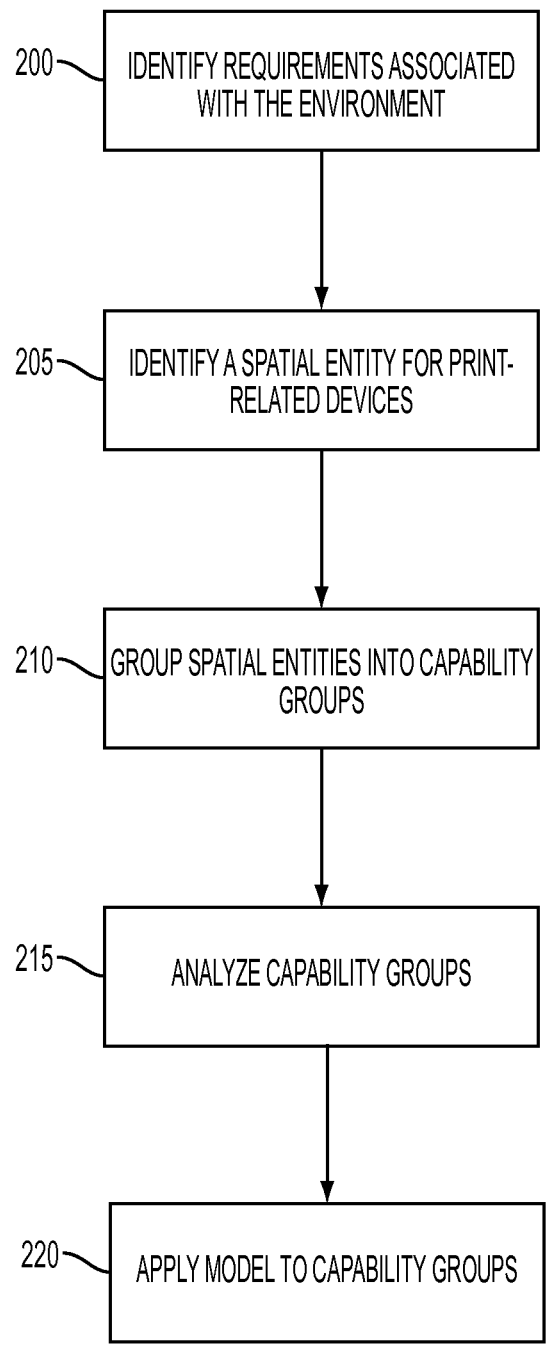
FIG. 2 illustrates an exemplary method of determining recommended print-related devices for a document environment according to an embodiment.

FIG. 2 illustrates an exemplary method of determining 100 recommended print-related devices for an environment according to an embodiment. In an embodiment, one or more requirements associated with the environment may be identified 200. The requirements may be specified by a user, a manager, an owner or other person of authority associated with the environment. In an embodiment, a requirement associated with an environment may include a maximum number of print devices for the environment, a ratio of users to print devices, a maximum operation cost for the environment and/ or other similar constraints.

In an embodiment, a spatial entity may be identified 205 for one or more of the print-related devices currently in the document environment. A spatial entity may include an area surrounding a print-related device. A spatial entity may include one or more users of the print-related device who are located within the area. For example, in an office environment, a spatial entity may encompass the users associated with one or more offices, desks, cubicles and/or the like located within the environment. In an embodiment, a spatial entity may be associated with one or more coordinates. The coordinates may be those associated with a map of the environment and/or the like.

In an embodiment, each spatial entity may be associated with print volume information. Print volume information may represent the volume processed by the print-related device in the spatial entity over a certain period of time. For example, if the print-related device in a spatial entity is a printer, the print volume information associated with the spatial entity may include the total number of sheets processed by the printer over a certain period of time. In an embodiment, the print volume information may include the total number of sheets processed by the printer for users within the spatial entity over a certain period of time.

In an embodiment, print volume information may include a volume associated with different types of documents that are processed by a print-related device. For example, print volume information may include black print volume, black copy volume, fax volume, color print value, color copy volume, color scan volume and/or the like. Print volume information may include the volume associated with other capabilities performable by a certain print-related device.

In an embodiment, print volume information may be determined from actual usage data from a print-related device. For example, one or more print-related devices in an environment may be inventoried, and the output from such devices may be measured over a period of time. Alternatively, print volume information may be received from computing devices associated with one or more users within a spatial entity. For example, a user may be associated with a computer, workstation and/or the like that the user may use to print a document. The print volume information associated with this print job may be collected from a user's computing device.

In an embodiment, each spatial entity may be associated with capability information. Capability information may include the functions or operations that are performable by an associated print-related device. For example, in a document environment, capabilities may include fax, copy, scan, print, finishing operations and/or the like.

In an embodiment, spatial entities may be grouped 210 into one or more capability groups based on the print volume information, the capability information and the coordinates associated with one or more of the spatial entities. A capability group may represent a group of users, print volume information associated with the users' output and any capabilities required by the users. In an embodiment, a capability group may include an aggregation of the print volume information, users and capabilities of the spatial entities that comprise the capability group. For example, if a capability group is formed from a first spatial entity associated with fax capability and a second spatial entity associated with black and white print capability, the capability group may be associated with both fax and black and white print capabilities.

Figure 3:
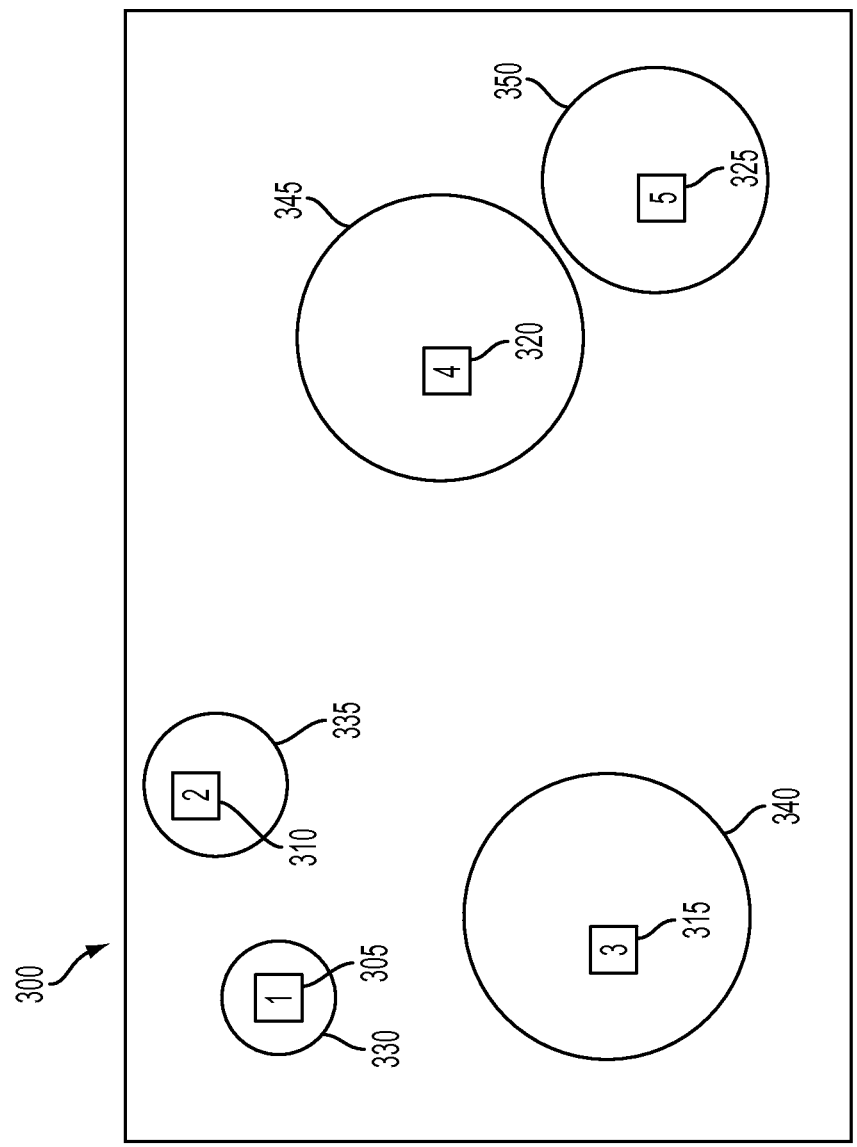
FIG. 3 illustrates exemplary spatial entities associated with an environment according to an embodiment.

Spatial entities may be grouped 210 based on the capability information associated with the spatial entities. For example, spatial entities that require the same or comparable capabilities may be combined into one or more capability groups. For example, FIG. 3 illustrates exemplary spatial entities associated with an environment. As illustrated by FIG. 3, the environment 300 includes five print-related devices 305, 310, 315, 320, 325 and five spatial entities 330, 335, 340, 345, 350. Table 1 illustrates exemplary capabilities associated with each spatial entity.

TABLE 1

| Spatial Entity | Capability |
|---|---|
| 1 | Black and White Print Scan |

TABLE 1-continued

| Spatial Entity | Capability |
|---|---|
| 2 | Black and White Print |
| 3 | Color Print |
| 4 | Black and White Print |
|   | Fax |
| 5 | Fax |

Figure 4:
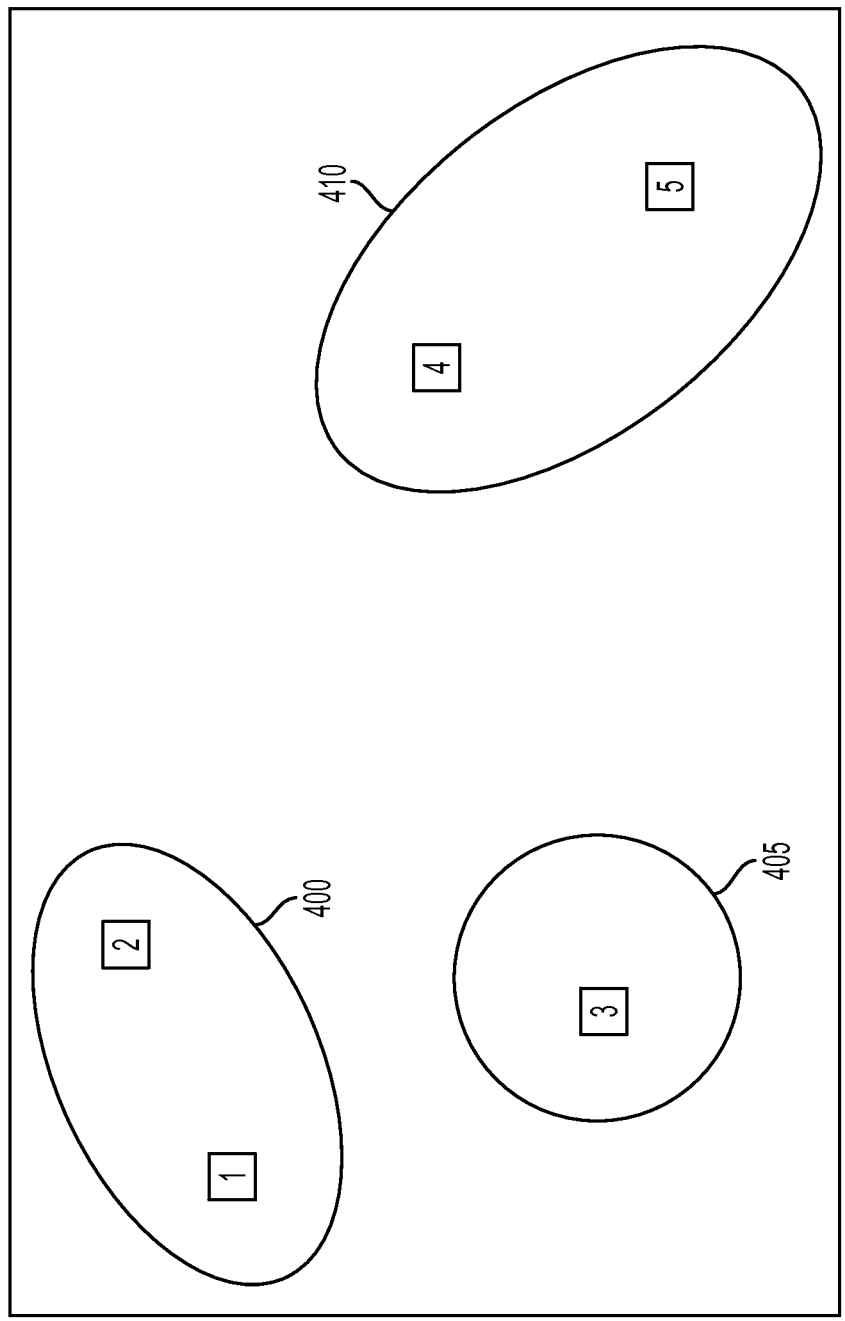
FIG. 4 illustrates exemplary capability groups according to an embodiment.
Figure 5:
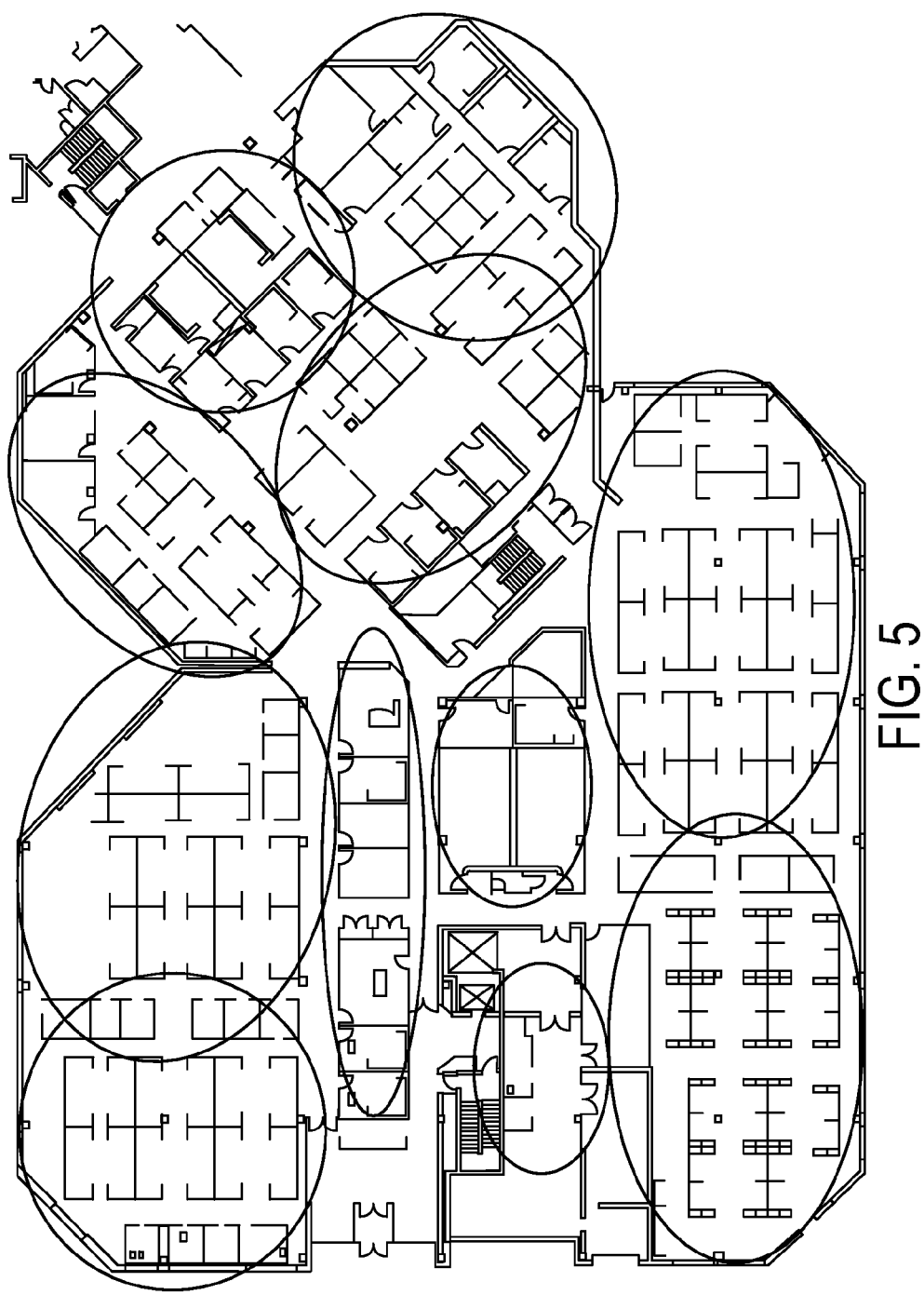
FIG. 5 illustrates capability groups associated with an exemplary document environment according to an embodiment.

FIG. 4 illustrates exemplary capability groups 400, 405, 410 that may be formed from the spatial entities illustrated in FIG. 3. As illustrated by FIG. 4, spatial entity 1 330 and 2 335 may be grouped into a capability group 400 because both require black and white print capabilities. Likewise, spatial entities 4 345 and 5 350 may be grouped into a capability group 410 because both require fax capabilities. In an alternate embodiment, spatial entities may not be grouped, but may be considered to be separate capability groups. For example, in FIG. 3, spatial entity 3 340 may be considered to be a separate capability group 405. FIG. 5 illustrates capability groups associated with an exemplary document environment according to an embodiment.

In an embodiment, spatial entitles may be grouped 210 based on their relative locations, which may be determined by the coordinates associated with each spatial entity. For example, referring to FIG. 3, spatial entities 1 and 2 may be grouped because each requires black and white print capabilities and is proximately located to the other.

In an embodiment, the capability groups and/or spatial entities may be analyzed 215 to determine one or more recommended print-related devices for the environment. For example, the volume information, volume type and capabilities associated with the capability groups and/or spatial entities may be analyzed 215 to determine which print-related device or devices would be operationally the most efficient, the most cost-efficient and/or the like.

In an embodiment, a model may be applied 220 to the capability groups to model multiple, varying-sized groupings of capability groups based on the specified ratio of users to print-related devices. The model may be a linear programming model, a simulation model and/or the like. Additional and/or alternate models may be used within the scope of this disclosure.

Figure 9:
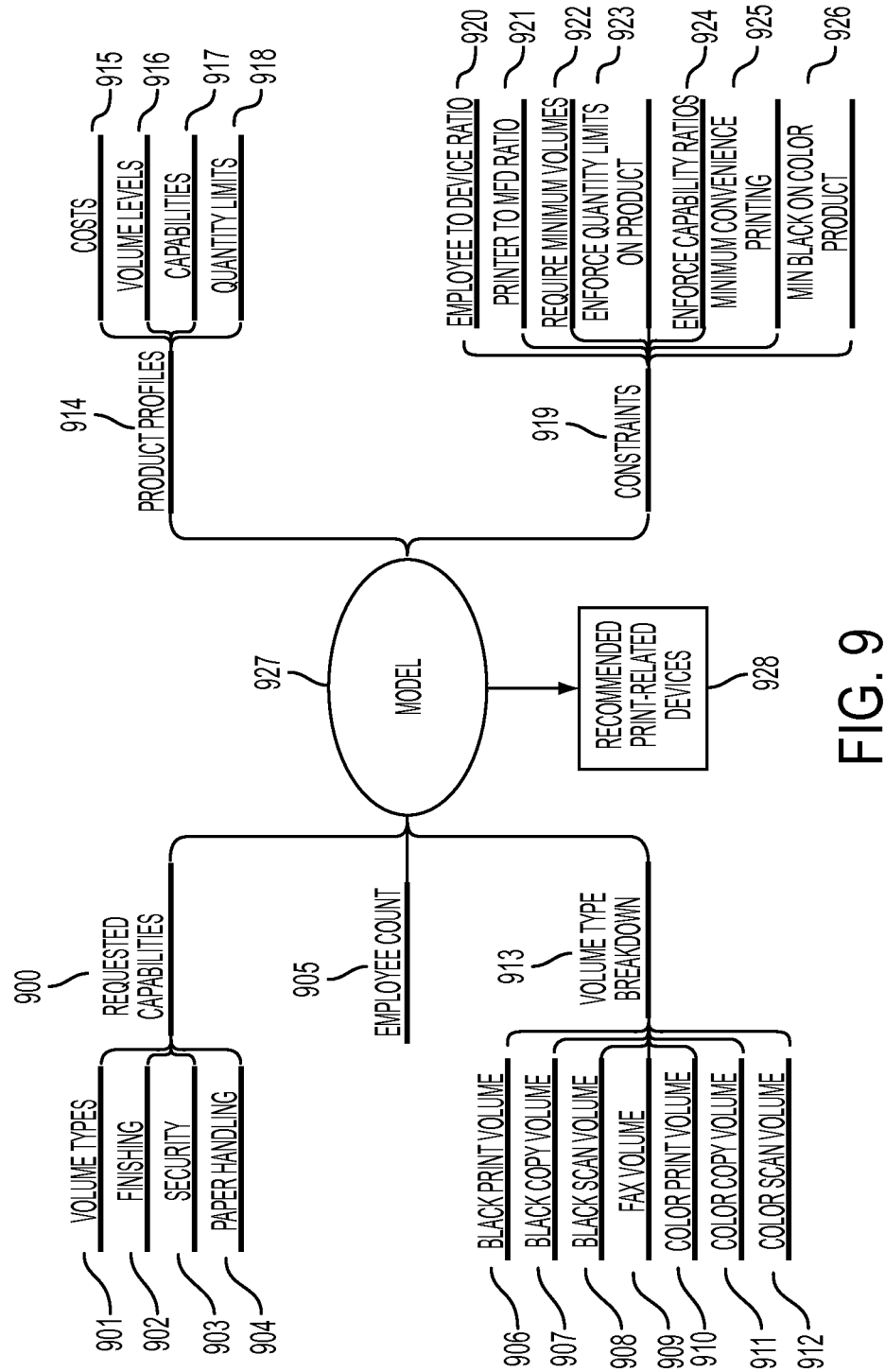
FIG. 9 illustrates exemplary factors that a model may use to determine one or more recommended print-related devices for the environment according to an embodiment.

The model may vary the permutations of possible capability group combinations to determine one or more recommended print-related devices 928 for the environment. FIG. 9 illustrates exemplary factors that a model 927 may use to determine one or more recommended print-related devices for the environment. As illustrated by FIG. 9, this determination may be made based on, for example, requested capabilities 900, an employee count 905, a volume type breakdown 913, product profiles 914 and/or constraints 919 associated with the capability group combination.

In an embodiment, requested capabilities 900 may include requested volume types 901, finishing services 902, security requirements 903, paper handling instructions 904 and/or the like. An employee count 905 may be represent the number of employees who utilize one or more print-related devices in a capability group. A volume type breakdown 913 may include volume information associated with capabilities, such as black print 906, black copy 907, black scan 908, fax 909, color print 910, color copy 911, color scan 912 and/or the like.

In an embodiment, product profiles 914 may include information associated with one or more print-related devices such as costs 915, volume levels 916, capabilities 917, quantity limits 918 and/or the like. Exemplary constraints 919 may include employee to device ratio 920, printer to device ratio 921, required minimum volumes 922, enforcement of quantity limits on a device 923, capability ratios 924, minimum convenience printing 925, minimum black on color product 926, and/or the like.

In an embodiment, minimum convenience printing 925 may be accomplished by identifying one or more print-related devices. In an embodiment, the identified devices may be identified as convenient devices. A convenient print-related device may be one that is located relatively close in proximity to one or more users. The convenience of a print-related device may be determined by a footprint associated with the device, accessories associated with a device, capabilities associated with a device and/or the like. In an embodiment, the model 927 may associate a certain percentage of print volume with the identified devices.

In an embodiment, minimum black on color product may 926 may be a constraint that may require the model 927 to associate a certain percentage of black print volume with a print-related device that prints in black ink and color ink.

Figure 6:
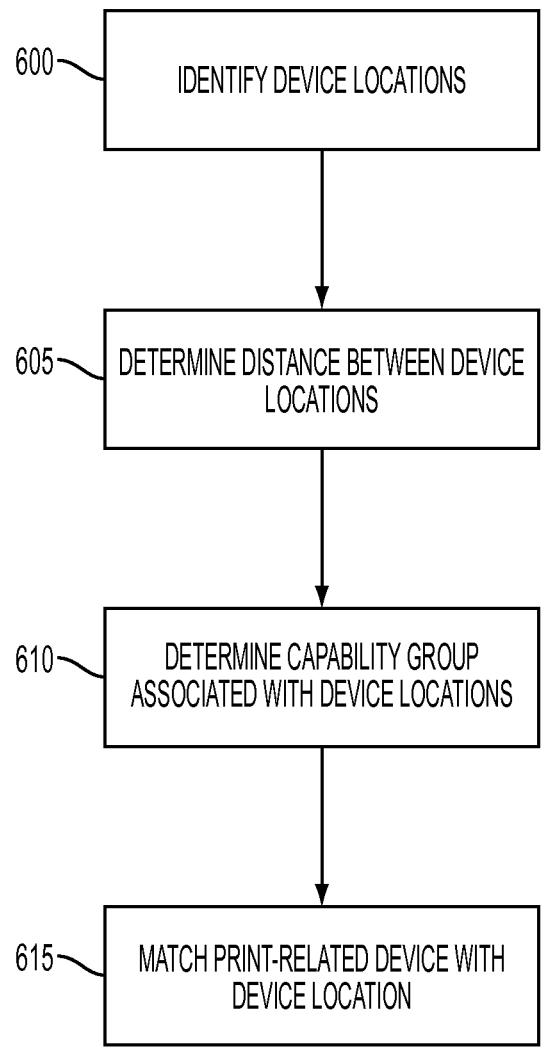
FIG. 6 illustrates an exemplary method of determining a placement of one or more recommended devices according to an embodiment.

In an embodiment, placement of the one or more recommended print-related devices may be determined 105. A placement associated with a recommended print-related device may maximize the distribution associated with the print-related device while satisfying the environment requirements. FIG. 6 illustrates an exemplary method of determining a placement of one or more recommended devices according to an embodiment.

In an embodiment, one or more device locations where a recommend print-related device may be placed may be identified 600. These device locations may be identified 600 based on physical constraints of the environment. For example, a device location may be identified 600 based on the available power supply, space and/or the like.

In an embodiment, the distance between device locations may be determined 605. For example, a distance between a device location and one or more other device locations in the environment may be determined 605. A distance may be determined 605 based on coordinates associated with the device location. In an embodiment, a distance between device locations may be measured.

In an embodiment, a spatial entity and/or capability group associated with each location may be determined 610. For example, the coordinates of a device location may be compared to the coordinates associated with each spatial entity and/or capability group to determine in which spatial entity and/or capability group the device location resides.

Figure 7:
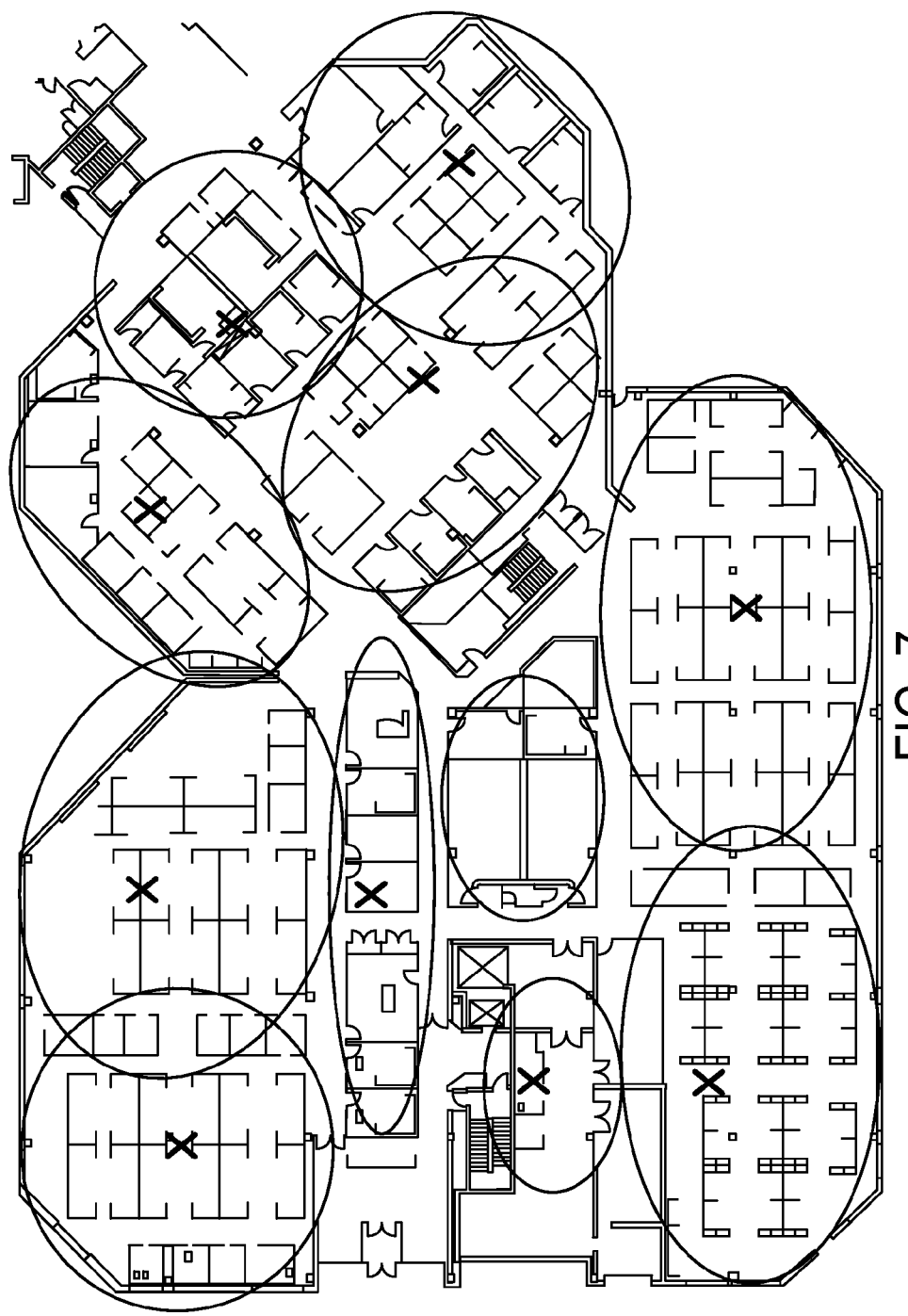
FIG. 7 illustrates exemplary device locations according to an embodiment.

In an embodiment, each recommended print-related device may be matched 615 with a device location. The matching 615 may be based on a number of factors such as the volume information associated with the corresponding spatial entity and/or capability group, the capability information associated with the corresponding spatial entity and/or capability group and/or the like. For example, FIG. 7 illustrates exemplary device locations for the document environment illustrated in FIG. 5.

Table 2A illustrates information associated with exemplary recommended print-related devices, and Table 2B illustrates information associated with exemplary capability groups.

TABLE 2A

| Recommended Print-Related Devices | Capabilities | High/Low Volume |
|---|---|---|
| Print-Related Device 1 | Black/White Print Scan | High Low |

TABLE 2A-continued

| Recommended Print-Related Devices | Capabilities | High/Low Volume |
|---|---|---|
| Print-Related Device 2 | Color Print | High |
| | Fax | Low |
| Print-Related Device 3 | Color Print | High |

TABLE 2B

| Location | Capabilities | High/Low Volume |
|---|---|---|
| Location 1 | Color Print | High |
| Location 2 | Black White Print | High |
| | Scan | Low |
| Location 3 | Color Print | High |
| | Fax | Low |

As illustrated by Table 2B, Location 1 is associated with a capability group whose users produce a high volume of color print jobs. As such, this location may be matched with Print-Related Device 3 from Table 2A because it is capable of producing a high volume of color print jobs. Similarly, Location 2 may be matched with Print-Related Device 1 and Location 3 may be matched with Print-Related Device 2. In an embodiment, additional and/or alternate factors may be considered within the scope of this disclosure to match recommended print-related devices with device locations. For example, the space available at the location may be compared to the size of a recommended print-related device.

In an embodiment, a report may be generated 110. The report may include the one or more recommended print-related devices for the environment. In an embodiment, the report may include a spatial entity and/or capability group associated with one or more recommended print-related devices, specifications associated with one or more recommended print-related devices, capabilities associated with one or more recommended print-related devices, dimensions associated with one or more recommended print-related devices and/or the like.

In an embodiment, a report may include a location for one or more of the recommended print-related devices. The report may include a named location for one or more print-related devices. For example, the report may provide that a first print-related device should be located in a first copy room. In an embodiment, the report may include coordinates for one or more print-related devices. The report may also include other information, such as volume and/or capability information associated with spatial entity and/or capability group, the dimensions of the location and/or the like.

In an embodiment, the report may be displayed to a user. For example, the report may be printed. The report may be emailed, faxed or otherwise transmitted to a user. In an embodiment, a report may be displayed to a user on a computing device.

Figure 8:
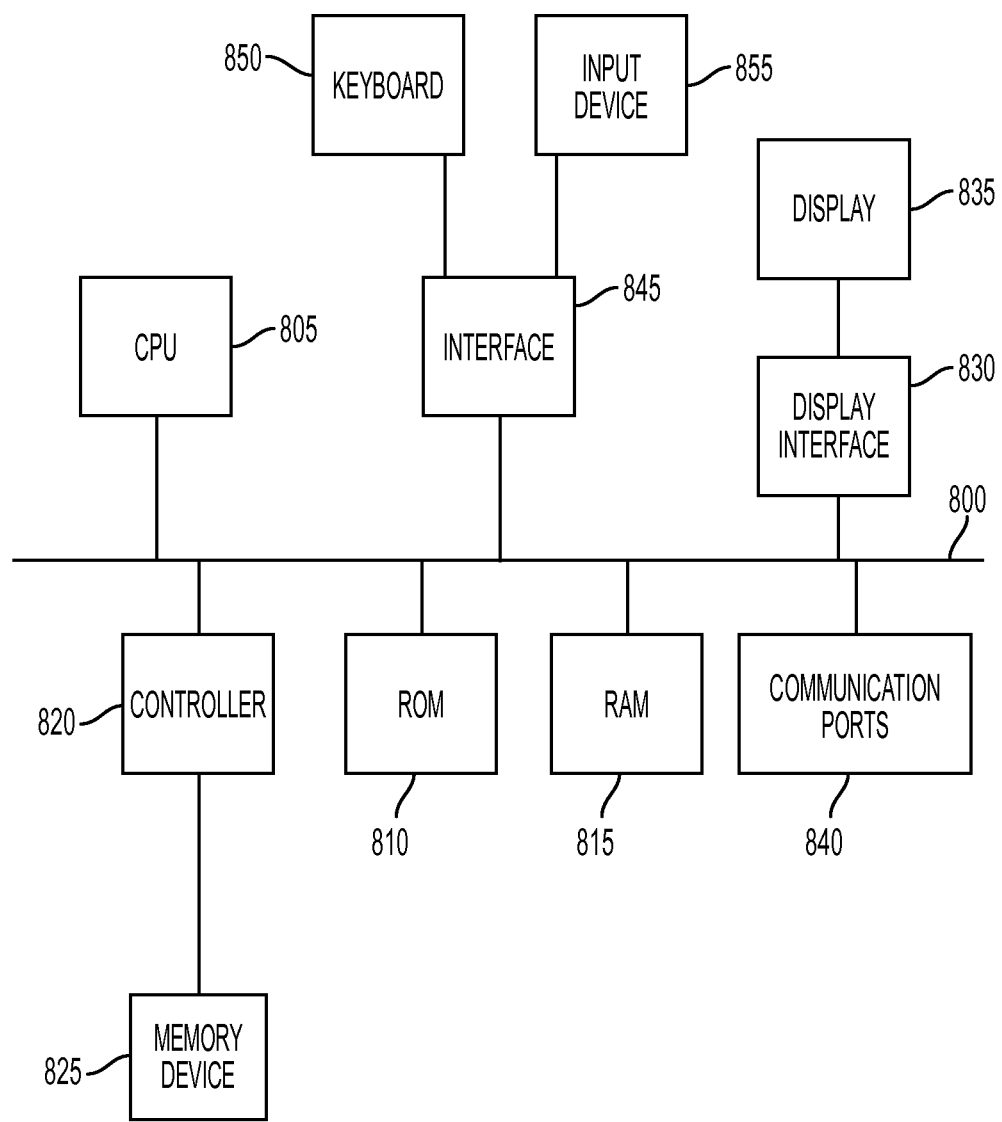
FIG. 8 illustrates exemplary internal hardware that may be used to contain or implement program instructions according to an embodiment.

FIG. 8 depicts a block diagram of exemplary internal hardware that may be used to contain or implement program instructions according to an embodiment. A bus 800 serves as the main information highway interconnecting the other illustrated components of the hardware. CPU 805 is the central processing unit of the system, performing calculations and logic operations required to execute a program. Read only memory (ROM) 810 and random access memory (RAM) 815 constitute exemplary memory devices.

A controller 820 interfaces with one or more optional memory devices 825 to the system bus 800. These memory devices 825 may include, for example, an external or internal DVD drive, a CD ROM drive, a hard drive, flash memory, a USB drive or the like. As indicated previously, these various drives and controllers are optional devices.

Program instructions may be stored in the ROM 810 and/or the RAM 815. Optionally, program instructions may be stored on a tangible computer readable medium such as a compact disk, a digital disk, flash memory, a memory card, a USB drive, an optical disc storage medium, such as Blu-ray™ disc, and/or other recording medium.

An optional display interface 830 may permit information from the bus 800 to be displayed on the display 835 in audio, visual, graphic or alphanumeric format. Communication with external devices may occur using various communication ports 840. An exemplary communication port 840 may be attached to a communications network, such as the Internet or an intranet.

The hardware may also include an interface 845 which allows for receipt of data from input devices such as a keyboard 850 or other input device 855 such as a mouse, a joystick, a touch screen, a remote control, a pointing device, a video input device and/or an audio input device.

An embedded system, such as a sub-system within a xerographic apparatus, may optionally be used to perform one, some or all of the operations described herein. Likewise, a multiprocessor system may optionally be used to perform one, some or all of the operations described herein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system for determining a configuration of print-related devices in a document environment, the system comprising:
a computing device; and
a computer-readable storage medium in communication with the computing device, wherein the computer-readable storage medium comprises one or more programming instructions for:
identifying a plurality of environment requirements comprising one or more required print capabilities and a ratio of users to print-related devices associated with a document environment,
for each print-related device currently in the document environment, identifying a corresponding spatial entity having associated print volume information and associated print capability information,
grouping a plurality of the spatial entities having similar print capability information into one or more capability groups, wherein each capability group is associated with the print volume information and print capability information associated with the spatial entities comprising the capability group, and
determining one or more recommended print-related devices for the document environment by analyzing the print volume information and print capability information associated with a plurality of capability groups such that the recommended print-related devices satisfy the environment requirements.

2. The system of claim 1, wherein the one or more programming instructions for identifying a plurality of environment requirements comprise one or more programming instructions for receiving the plurality of environment requirements from a user.

3. The system of claim 1, further comprising one or more programming instructions for determining the print volume information by collecting usage data from the one or more print-related devices over a period of time.

4. The method of claim 1, further comprising one or more programming instructions for determining the print volume information by receiving usage data from one or more computing devices associated with one or more users over a period of time.

5. The system of claim 1, wherein the one or more programming instructions for grouping a plurality of the spatial entities into one or more capability groups comprise one or more programming instructions for grouping a plurality of the spatial entities based on coordinates associated with the spatial entities.

6. The system of claim 1, wherein the one or more programming instructions for determining one or more recommended print devices comprise one or more programming instructions for:
modeling the print volume information and the print capability information for different combinations of capability groups.

7. The system of claim 6, wherein the one or more programming instructions for modeling comprise one or more programming instructions for modeling the volume information and capability information for different combinations of capability groups using a linear programming model.

8. The system of claim 6, wherein the one or more programming instructions for modeling comprise one or more programming instructions for modeling the volume information and capability information for different combinations of capability groups using a simulation model.

9. The system of claim 8, wherein the one or more programming instructions for generating a report comprise one or more programming instructions for generating a report comprising the device location associated with each recommended print-related device.

10. The system of claim 6, wherein the one or more programming instructions for modeling comprise one or more programming instructions for modeling the volume information and capability information based on one or more of the following:
requested capabilities;
an employee count;
volume type information;
one or more product profiles; and
one or more constraints.

11. The system of claim 1, further comprising one or more programming instructions for determining a device location within the environment for each of the recommended print-related devices.

12. The system of claim 11, wherein the one or more programming instructions for determining a device location comprise one or more programming instructions for:
identifying one or more device locations in the document environment;
determining a capability group associated with each device location; and
for each print-related device, determining a device location based on one or more of the following:
print volume information corresponding to the associated capability group,
print capability information corresponding to the associated capability group,
coordinates associated with the device location,
coordinates associated with the capability group, and
physical constraints of the device location.

13. The system of claim 1, wherein the computer-readable storage medium comprises one or more programming instructions for generating a report comprising the recommended print-related devices.

14. The system of claim 13, wherein the computer-readable storage medium comprises one or more programming instructions for displaying the report to a user.

15. A system for determining a configuration of print-related devices in a document environment, the system comprising:
a computing device; and
a computer-readable storage medium in communication with the computing device, wherein the computer-readable storage medium comprises one or more programming instructions for:
identifying a plurality of environment requirements comprising one or more required print capabilities and a ratio of users to print-related devices associated with a document environment,
for each print-related device currently in the document environment, identifying a corresponding spatial entity having associated print volume information and associated print capability information,
grouping a plurality of the spatial entities having similar print capability information into one or more capability groups, wherein each capability group is associated with the print volume information and print capability information associated with the spatial entities comprising the capability group, and
determining one or more recommended print-related devices for the document environment by modeling the print volume information and the print capability information for different combinations of capability groups, wherein the one or more recommended print-related devices satisfy the environment requirements.

16. The system of claim 15, further comprising one or more programming instructions for determining the print volume information by collecting usage data from the one or more print-related devices over a period of time.

17. The method of claim 15, further comprising one or more programming instructions for determining the print, volume information by receiving usage data from one or more computing devices associated with one or more users over a period of time.

18. The system of claim 15, wherein the one or more programming instructions for grouping a plurality of the spatial entities into one or more capability groups comprise one or more programming instructions for grouping a plurality of the spatial entities based on coordinates associated with the spatial entities.

19. The system of claim 15, wherein the one or more programming instructions for modeling comprise one or more programming instructions for modeling the volume information and capability information for different combinations of capability groups using a linear programming model.

20. The system of claim 15, wherein the one or more programming instructions for modeling comprise one or more programming instructions for modeling the volume information and capability information for different combinations of capability groups using a simulation model.

21. The system of claim 15, wherein the one or more programming instructions for modeling comprise one or more programming instructions for modeling the volume information and capability information based on one or more of the following:

requested capabilities;
an employee count;
volume type information;
one or more product profiles; and
one or more constraints.

\* \* \* \* \*